(12) United States Patent
Lee et al.

(10) Patent No.: US 6,720,885 B1
(45) Date of Patent: Apr. 13, 2004

(54) METHOD FOR GENERATING A SIGNAL VIBRATION ALERT

(75) Inventors: Chin-Wen Lee, Hsinchu Hsien (TW); Hung-Wen Chiou, Hsinchu (TW)

(73) Assignee: ProMOS Technologies Inc., Hsinchu (TW)

( * ) Notice: Subject to any disclaimer, the term of this patent is extended or adjusted under 35 U.S.C. 154(b) by 0 days.

(21) Appl. No.: 09/993,436

(22) Filed: Nov. 13, 2001

(51) Int. Cl.[7] ............................................... G08B 21/00
(52) U.S. Cl. ...................... 340/683; 340/680; 73/593; 73/659; 73/660; 700/175; 702/56
(58) Field of Search ................................ 340/679, 683, 340/690, 680; 73/660, 593, 659; 700/175; 702/56

(56) References Cited

U.S. PATENT DOCUMENTS

| | | | | |
|---|---|---|---|---|
| 3,677,072 A | * | 7/1972 | Weichbrodt et al. ........ | 340/683 |
| 4,727,524 A | * | 2/1988 | Thomas et al. ............. | 340/680 |
| 4,894,644 A | * | 1/1990 | Thomas ....................... | 340/680 |
| 5,251,151 A | * | 10/1993 | Demjanenko et al. ........ | 702/56 |
| 6,195,621 B1 | * | 2/2001 | Bottomfield ................. | 702/56 |
| 6,321,602 B1 | * | 11/2001 | Ben-Romdhane ........... | 340/679 |

* cited by examiner

*Primary Examiner*—Daniel J. Wu
(74) *Attorney, Agent, or Firm*—Birch, Stewart, Kolasch & Birch, LLP

(57) ABSTRACT

The present invention provides a method for signal vibration alert. The method of the present invention recognizes significant substantial swerves and corresponding substantial edge-to-edge differences by eliminating the adverse effect of noise among signals generated by an apparatus. When the frequency of the substantial edge-to-edge differences that exceed an acceptable range of the frequency limit is too large, the method of the present invention automatically generates an alert to indicate aberration in the apparatus such that the monitoring staff is informed and allowed to take necessary measures responding to the aberration.

6 Claims, 7 Drawing Sheets

METHOD FOR GENERATING A SIGNAL VIBRATION ALERT

BACKGROUND OF THE INVENTION

1. Field of the Invention

The present invention relates to a method for generating an alert, and more particularly relates to a method for automatically generating an alert when the level and frequency of signal vibration exceed a certain scale.

2. Description of the Related Art

To maintain a stable manufacturing process, signals generated in the manufacturing process are monitored. The signals may refer to the intensity of a light source used by a stepper required in the semiconductor manufacturing process, or the flow rate of etching solution used by a wet etching machine. Signal monitoring prevents products from being damaged by irregular operation.

Generally, signal monitoring is applied by predetermining upper and lower limits of so the signals. When the signals generated by process tools exceed the predetermined upper and lower limits, the monitor generates an alert to indicate the aberration in the apparatus such that the monitoring staff can take necessary action. FIG. 1 is a graph showing signals generated within a time interval by a process tool. In FIG. 1, all signals fall within a range between the upper and lower limits (i.e. 3.0 and 1.4 in FIG. 1). If the machine is using a general monitoring method, as a result, no alert is generated.

Although the signals fall within a range between the upper limit and lower limit, signal vibration may be an indicator of potential problems resulting in malfunction of process tools. When applying a general monitoring method that only employs upper and lower limits, not only signal vibration, but also potential problems are hidden.

SUMMARY OF THE INVENTION

The main object of the present invention is to provide a method for generating a signal vibration alert, wherein the vibration frequency is precisely calculated and a timely alert is provided to monitoring staff without interference from insignificant noise.

The method of the present invention collects a plurality of signals generated by a apparatus within a time interval. Based on the plurality of signals, a plurality of substantial swerves and of corresponding substantial edge-to-edge differences are recognized. Every three consecutive substantial swerves constitute a peak or a valley. Each substantial edge-to-edge difference is the edge-to-edge difference between every two consecutive swerves, and exceeds a predetermined noise range. Then, the frequency of the substantial edge-to-edge differences that exceed an acceptable range is calculated. If the frequency exceeds a predetermined frequency limit, an alert is automatically generated to indicate aberration in the apparatus.

In particular, the method of the present invention ignores signal variation resulting from noise, and focuses on recognizing the real vibration amplitude (i.e. substantial edge-to-edge difference) from signals generated. As soon as the substantial edge-to-edge differences exceed an acceptable range of the frequency limit, there may be potential problems concerning the operation of the apparatus.

The advantage of the present invention is that given signals do not exceed upper and lower limits; the method indicates the status of an apparatus by monitoring signal vibration and advances a timely alert to monitoring staff.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

The main focus of the present invention lies in ignoring the vibration of signals smaller than a certain scale, and calculating the frequency of the vibration exceeding a certain scale, thereby determining whether the corresponding process tool shows an aberration based on increased frequency of the vibration.

Figure 2:
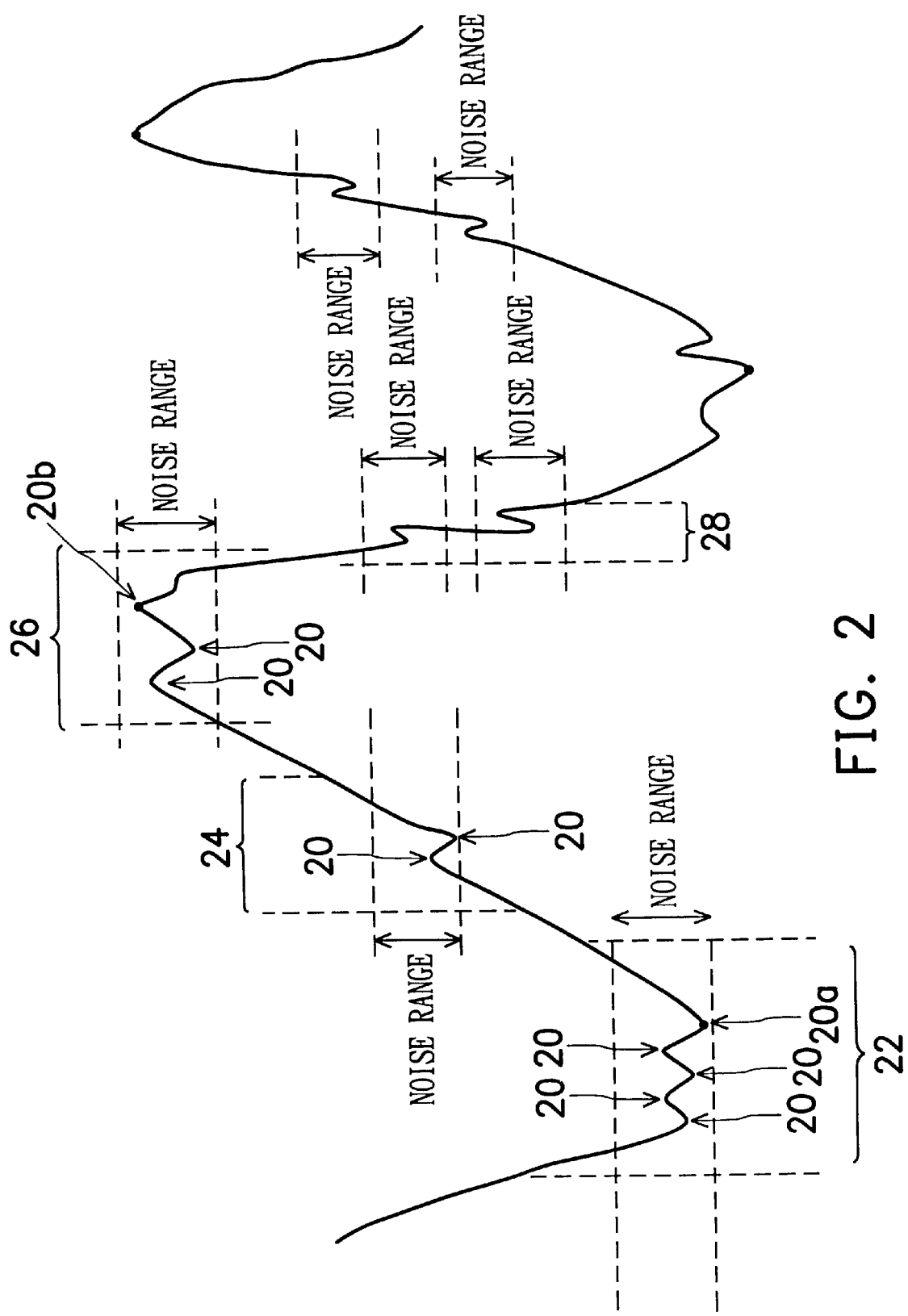
FIG. 2 is a graph showing the relationship between the signals and the method according to the present invention.

FIG. 2 is a graph showing the relationship between the signals and the method according to the present invention. When the signal trend turns from ascending to descending or from descending to ascending, a swerve 20 is formed. A swerve can be either a peak or a valley. The value difference between two swerves is defined as an edge-to-edge difference. The method according to the present invention predetermines a noise range. If an edge-to-edge difference falls within the noise range, the signal variation is regarded as noise. Noise goes through appropriate screening that recognizes significant substantial swerves and corresponding edge-to-edge differences. In this way, signal vibration resulting from potential malfunction problems can be identified.

Five swerves 20 are shown during the time interval 22 in FIG. 2, where the edge-to-edge differences of any two swerves 20 fall within the noise range. In terms of the signal waveform, the signals within the time interval 22 represent a valley of a substantial waveform. It is noted that a substantial swerve of the substantial waveform should be the maximal swerve among the five swerves 20 and is marked as 20a.

Three swerves 20 are shown during the time interval 26 in FIG. 2, where the edge-to-edge differences of any two swerves 20 fall within the noise range. In terms of the signal waveform, the signals within the time interval 26 represent a peak of a substantial waveform. It is noted that a substantial swerve of the substantial waveform should be the maximal swerve among the three swerves 20 and is specially marked as 20b.

Two swerves 20 are shown during the time interval 24 in FIG. 2, where the edge-to-edge differences of any two swerves 20 fall within the noise range. In terms of the signal waveform, the signals within the time interval 26 represent an ascending portion of a wave. Accordingly, the swerves 20 during the time interval 24 are recognized as insignificant noise, not substantial swerves.

Four swerves 20 are shown during the time interval 28 in FIG. 2. Although not all the edge-to-edge differences of any two swerves 20 fall within the noise range, the edge-to-edge differences for ascending sections all fall within the noise range. In terms of the signal waveform, signals within the time interval 28 represent a descending portion of a wave. Accordingly, the swerve 20 during the time interval 28 are recognized as insignificant noises, not substantial swerves.

Figure 1:
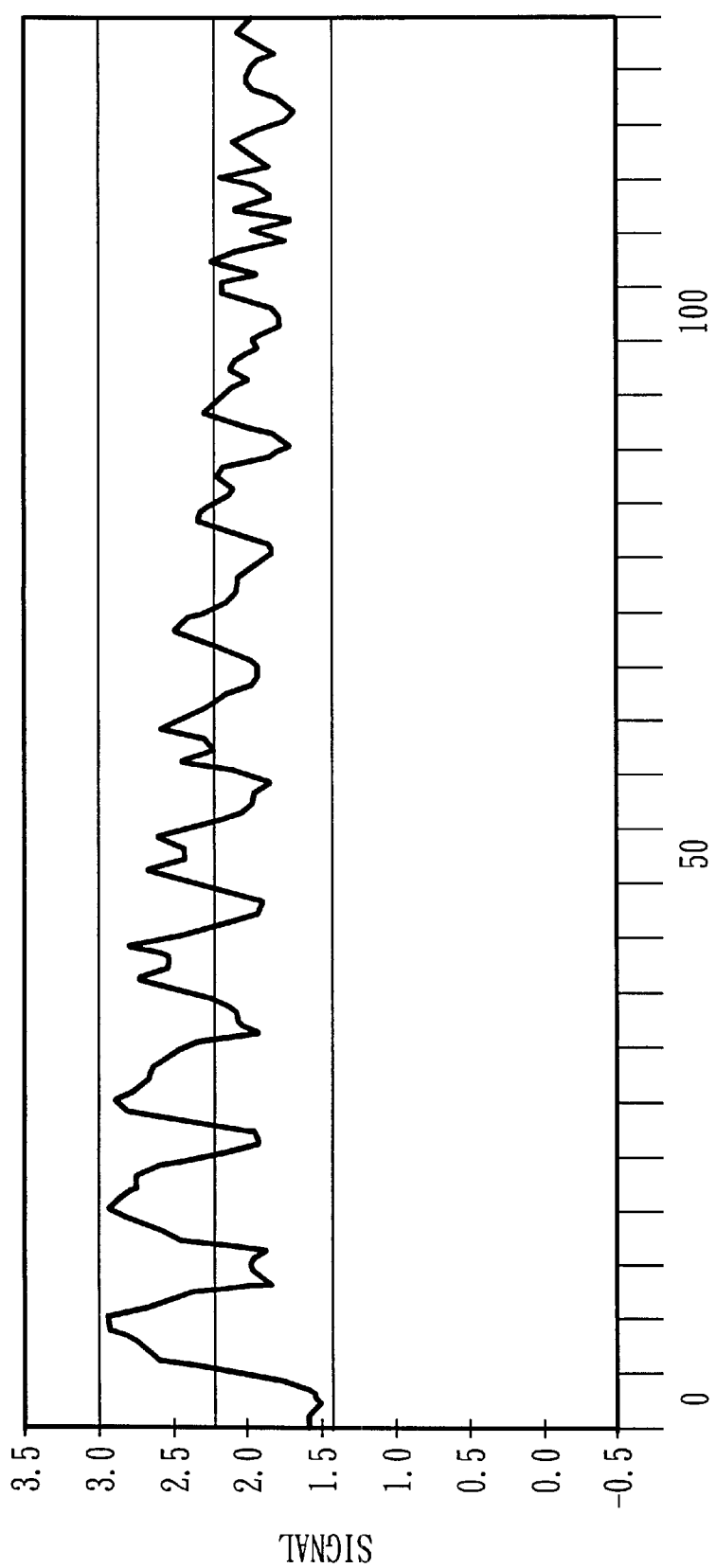
FIG. 1 is a graph showing signals generated within a time interval by a process tool.
Figure 3:
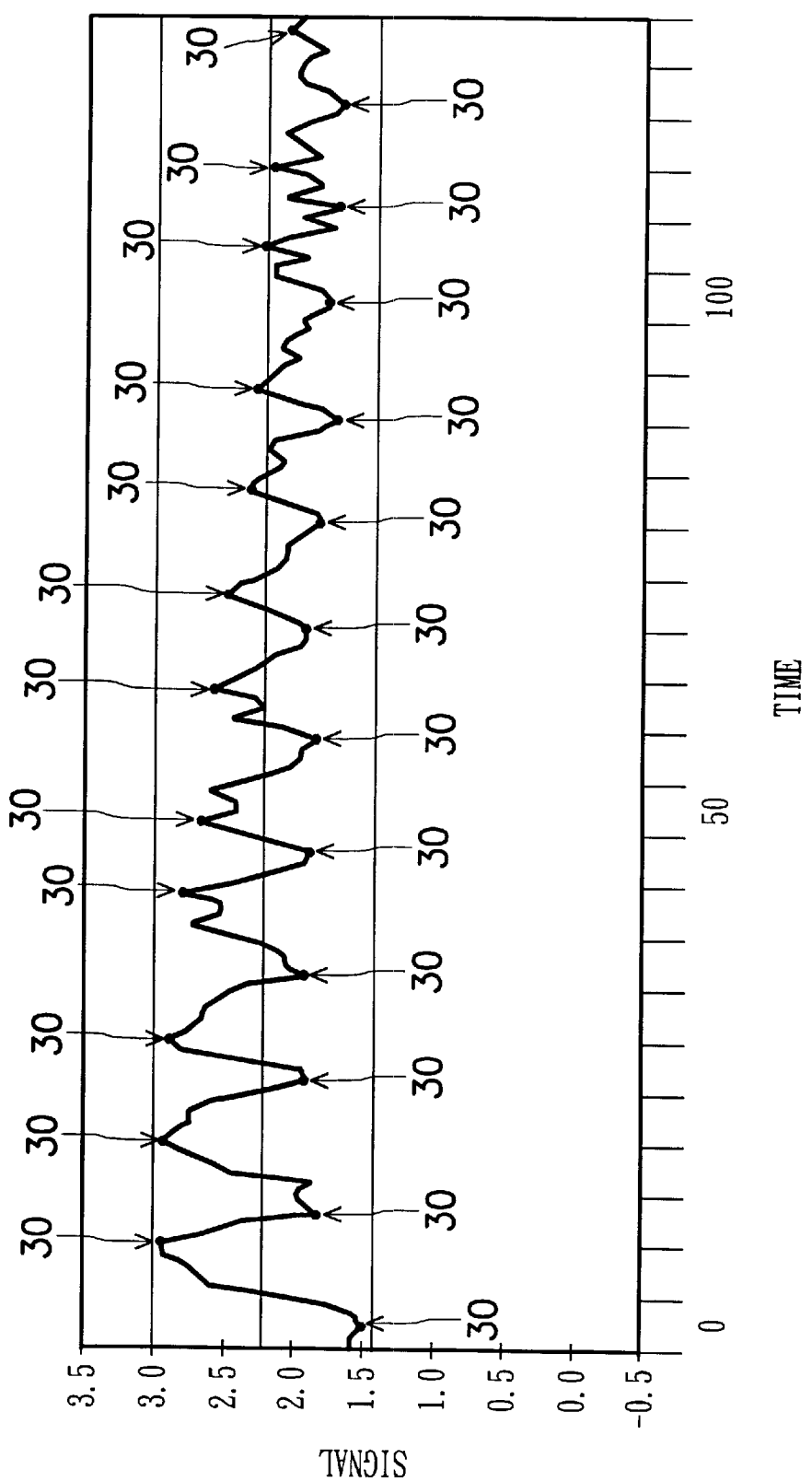
FIG. 3 is a graph showing substantial swerves among the signals recognized with the method according to the present invention.

FIG. 3 is a graph showing substantial swerves among the signals shown in FIG. 1. The substantial swerves are recognized with the method according to the present invention. According to the method of the present invention, some swerves in FIG. 1 are ignored as insignificant noise. Some swerves shown in FIG. 3 are selected as substantial swerves. Each substantial edge-to-edge difference of every two consecutive substantial swerves 30 has to exceed a predetermined noise range. In addition, every three consecutive substantial swerves constitute a peak or a valley. In other words, either the substantial swerves on the side exceed the middle substantial swerve, or the middle substantial swerve exceeds the substantial swerves on the side.

Figure 4:
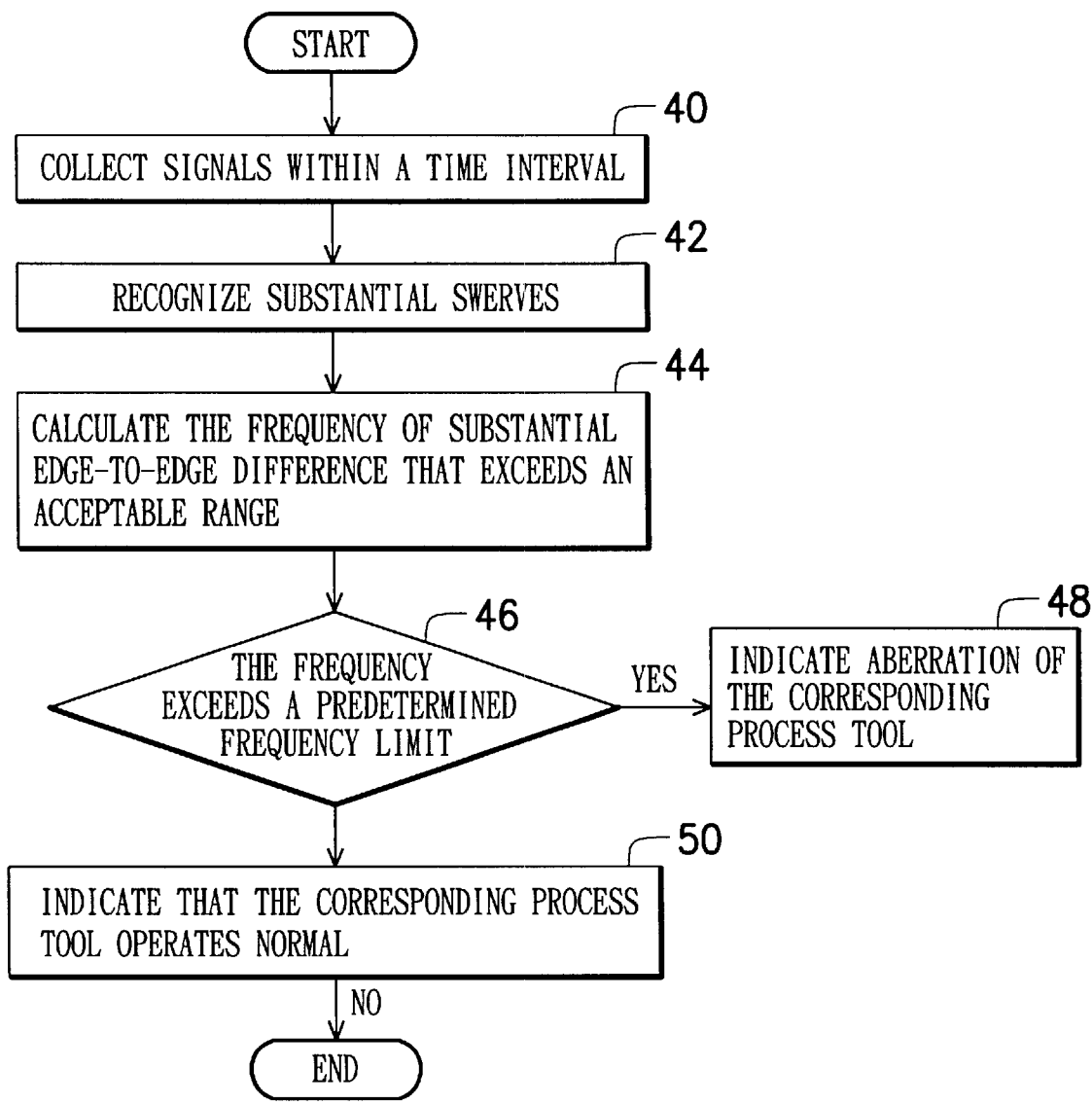
FIG. 4 is a flowchart of the method according to the present invention.

FIG. 4 is a flowchart of the method according to the present invention. Via a designated application, a server performs the method according to the present invention. Firstly, at step 40, the server collects a plurality of signals within a time interval. At step 42, the server recognizes substantial swerves. When the substantial swerves are recognized, it follows that corresponding substantial edge-to-edge differences are also attained. The substantial edge-to-edge differences can be regarded as real signal amplitude of the waveform without interference from insignificant noise. At step 44, the server calculates the frequency of substantial edge-to-edge difference (i.e. vibration amplitude) that exceeds an acceptable range. When the frequency exceeds a predetermined frequency limit (i.e. the flow following yes in response to step 46), the server generates an alert automatically to indicate aberration of the corresponding process tool (as shown at step 48). When the frequency does not exceed the predetermined frequency limit (i.e. the flow following no in response to step 46), the server indicates that the corresponding process tool does not have a signal vibration problem.

Figure 5:
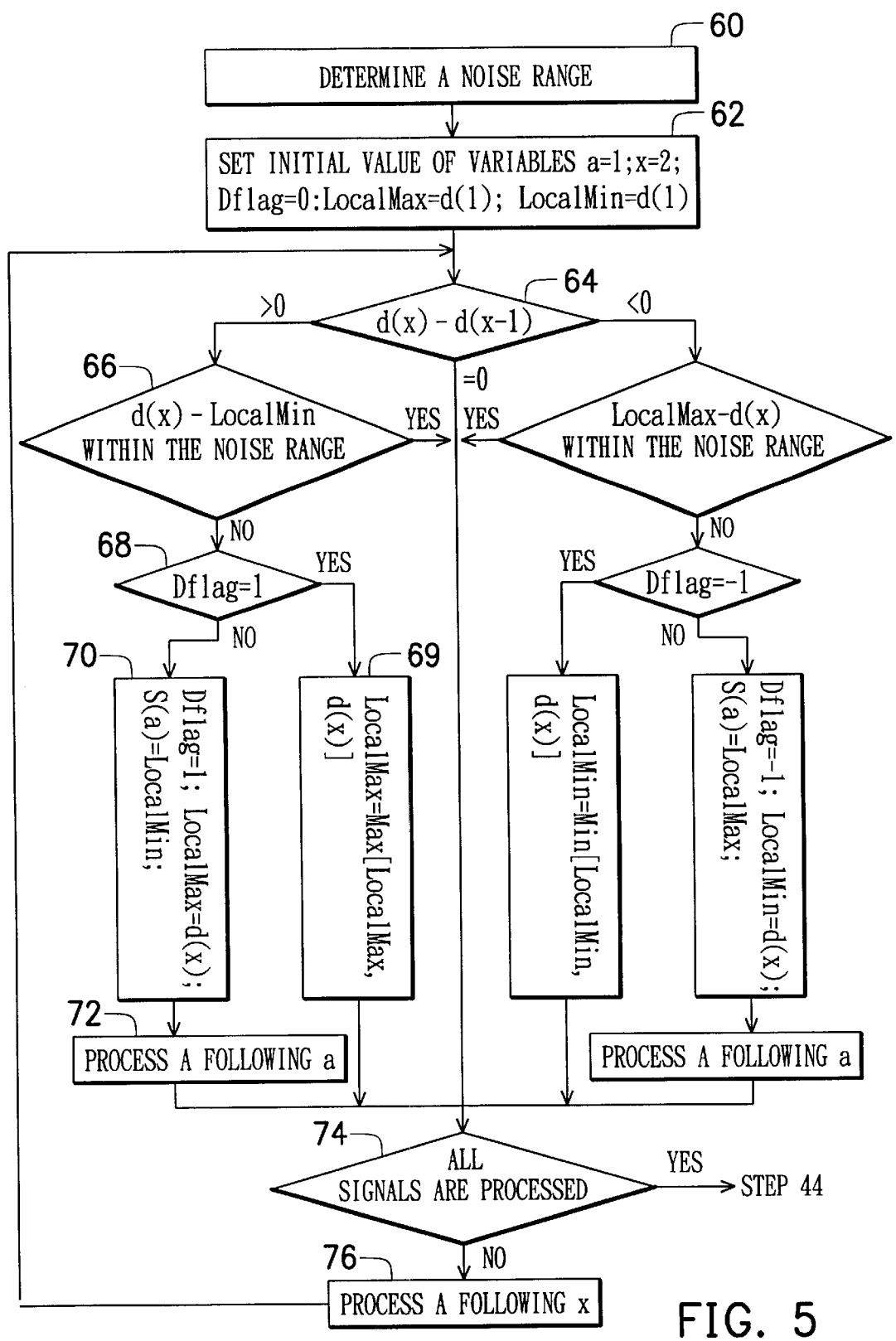
FIG. 5 is an application flowchart recognizing the substantial swerves.

FIG. 5 is an application flowchart of recognized substantial swerves. In FIG. 5, the S(a) represents the value of swerve a, d(X) represents the value of data x, Dflag represents a trend flag around the signal being processed (ascending trend refers to 1 and descending trend refers to −1), LocalMin represents the local minimum in the instant signal trend, and LocalMax represents the local maximum in the instant signal trend.

At step 60, the server determines a noise range. At step 62, the swerve determines an initial condition of local variables. Wherein x=2 represents that d(1) and d(2) are going to be selected, a=1 represents that the first substantial swerve is requested to be attained, the Dflag is set as 0 representing that the waveform portion is level, and the LocalMin and LocalMax are both set as the first signal value d(1).

When d(x) is greater than d(x−1) (the flow following >0 in response to step 64), it indicates that the instant signal d(x) represents an ascending trend. Nonetheless, if the ascending trend results from noise (the flow following yes in response to step 66), d(x) is omitted and the flow moves to process the next signal. If the ascending trend is obvious, it means that the instant trend is recognized as being ascending (the flow following no in response to step 66), accordingly, the trend flag is set as 1. Two conditions must be detected. One is that the instant trend and the previous trend are both ascending (the flow following yes in response to step 68). When the trend remains ascending, merely LocalMax is required to be updated (step 69). The other is that the instant trend (ascending) is different from the previous trend, level or descending (the flow following no in response to step 68). Under the circumstances, another new valley is recognized and as a result another substantial swerve is determined. This instant substantial swerve S(a) is set as a LocalMin. At the same time as setting S(a), d(x) is used to update LocalMax. In addition, trend flag is set as 1. This means that the instant trend is ascending (step 70). The method then moves to recognize a following substantial swerve (step 72). When signals have not been completely processed (the flow following no in response to step 74), the method flow moves to process a following signal (step 76).

In the right half of FIG. 5, when d(x) is smaller than d(x−1) (the flow following <0 in response to step 64), the process steps are similar with the process steps used in the left half of FIG. 5.

When all signals are processed (the flow following yes in response to step 74), the frequency of substantial edge-to-edge difference (i.e. vibration amplitude) that exceeds an acceptable range is calculated (step 44 in FIG. 4).

Figure 6:
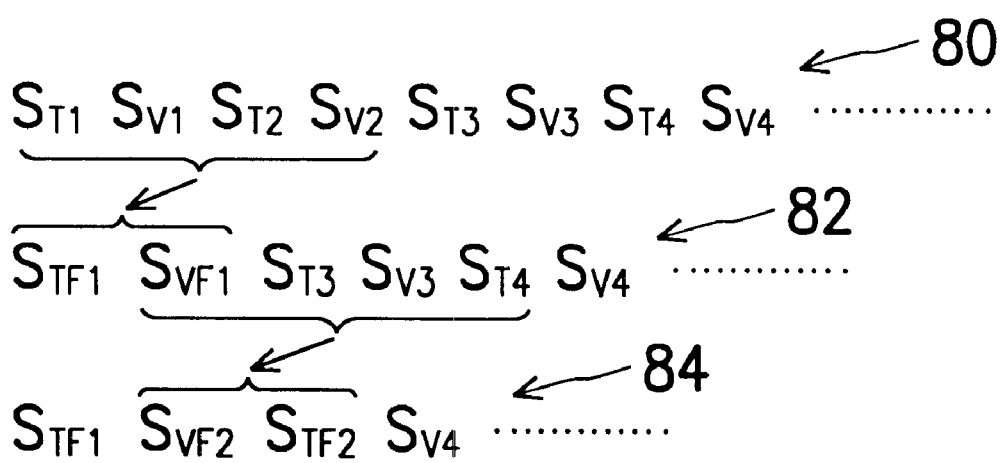
FIG. 6 is a perspective diagram showing the method for recognizing substantial swerves.

FIG. 6 is a perspective diagram showing the method for recognizing substantial swerves. Substantial swerves are also recognized with an alternative method. For example, all swerves among the signals, such as $S_{T1}$, $S_{V1}$, $S_{T2}$, $S_{V2}$ and others are recognized. T in $S_{T1}$ refers to a peak and V in $S_{V1}$ refers to a valley. As long as a signal is lower than two adjacent signals, the signal is a valley swerve and as long as a signal is higher than two adjacent signals, the signal is a peak swerve. It follows that the method recognizes whether the edge-to-edge difference of two consecutive peaks falls within the noise range. For example, if the edge-to-edge difference between $S_{V1\ and\ ST2}$ in swerve series 80 falls within the noise range, it means that $S_{V1}$ and $S_{T2}$ are swerves resulting from the noise and are required to be processed. In addition, $S_{t1}$, and $Sv_2$ adjacent to $S_{V1}$ and $S_{T2}$ are processed along with $S_{V1}$ and $S_{T2}$. The process step is to select a maximum between $S_{T1}$ and $S_{T2}$ to attain a new peak swerve $S_{TF1}(=Max(S_{T1}, S_{T2}))$, and a minimum between $S_{V1}$ and $S_{V2}$ to attain a new valley swerve $S_{VF1}(=Min(S_{V1}, S_{V2}))$: Then, replacing four consecutive swerves that are processed (ST1, SV1, ST2 and SV2) with STF1 and SVF1, a new swerve series 82 is generated and the alternating configuration of peaks and valleys stays as shown in FIG. 6.

If the edge-to-edge difference of $S_{T3}$ and $S_{V3}$ falls within the noise range, it means that $S_{T3}$ and $S_{V3}$ are two swerves resulting from noise. With the process steps similar to the method mentioned in the previous paragraph, and SVF2 and STF2 are attained to replace $S_{VF1}$, $S_{T3}$, $S_{V3}$ and $S_{T4}$, a new swerve series 84 is generated as shown in FIG. 6. Through the repetition of the method mentioned in the current and previous paragraphs, a final swerve series is generated; wherein the edge-to-edge difference every two adjacent peaks exceeds the noise range. Substantial swerves are the elements of the final swerve series.

Figure 7:
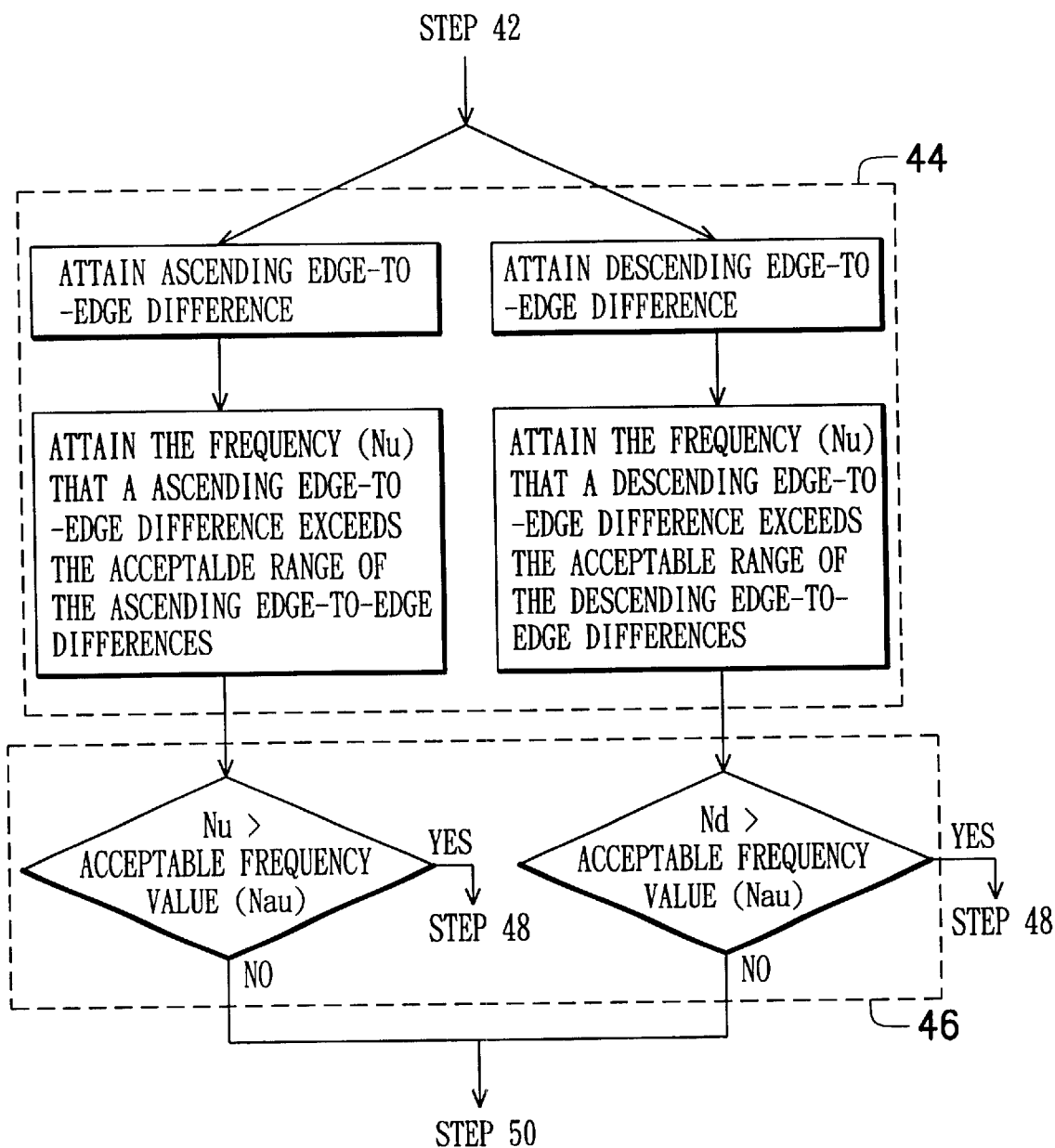
FIG. 7 is a detailed flowchart of the step 44 and step 46 shown in FIG.4.

FIG. 7 is a detailed flowchart of steps 44 and 46 shown in FIG. 4. After the substantial swerve is recognized, substantial edge-to-edge differences are attained via measuring the edge-to-edge difference of every two adjacent substantial swerves. Substantial edge-to-edge differences are categorized as a descending edge-to-edge difference, the distance from a peak substantial swerve to a valley substantial swerve, and an ascending edge-to-edge difference, a distance from a valley substantial swerve to a peak substantial swerve. The acceptable range of substantial edge-to-edge difference comprises an acceptable ascending range and acceptable descending range. When the frequency ($N_u$) by which an ascending edge-to-edge difference exceeds the acceptable ascending range is greater than an acceptable frequency value ($N_{au}$), an alert reminds monitoring staff that the corresponding process tool is operating in an aberrant fashion. Similarly, if the frequency ($N_d$) by which an instant descending edge-to-edge difference exceeds the acceptable descending range is greater than a predetermined value ($N_{ad}$), an alert is also sent.

The method of the present invention monitors signals generated by a process tool in manufacturing, thereby determining whether there are potential problems hidden among significant signal vibrations during operation. Thus monitoring staff can be informed in advance by an alert in response to significant signal vibration and take appropriate action. Accordingly, a stable production line is maintained.

Finally, while the invention has been described by way of examples and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for signal vibration alert, comprising:

collecting a plurality of signals generated by an apparatus within a time interval;

recognizing a plurality of substantial swerves and a plurality of corresponding substantial edge-to-edge differences based on the plurality of signals, wherein every three consecutive substantial swerves constitute a peak or a valley, each substantial edge-to-edge difference is the edge-to-edge difference between every two consecutive swerves, and each substantial edge-to-edge difference exceeds a predetermined noise range;

calculating a frequency of the substantial edge-to-edge differences exceeding an acceptable range; and automatically indicating an aberration in the apparatus when the frequency exceeds a predetermined frequency limit.

2. The method of claim 1, wherein the step of recognizing the substantial swerves further comprises:

ignoring a noise signal having a corresponding difference between a local minimum (LocalMin) or a local maximum (LocalMax) within the predetermined noise range;

setting one of the substantial swerves as the LocalMin and setting the LocalMax as an instant signal when a trend changes to ascending;

concluding the LocalMax as the maximum between the LocalMax and the instant signal when the trend remains ascending;

setting one of the substantial swerves as the LocalMax and setting the LocalMin as the instant signal when the trend of the noise turns to be descending; and concluding the LocalMin as a minimun between the LocalMin and the instant signal when the trend of the noise remains descending.

3. The method of claim 1, wherein the step of recognizing the substantial swerves further comprises:

a. sequentially recognizing a plurality of swerves based on the signals;

b. recognizing two consecutive swerves among the swerves wherein two consecutive swerves are a first swerve $S_1$ and a second swerve $S_2$;

c. repeating step (b) and substituting four consecutive swerves $S_0$, $S_1$, $S_2$ and $S_3$ with a $S_{M1}$ and a $S_{M2}$ when the edge-to-edge difference between $S_1$ and $S_2$ falls within a predetermined noise range, wherein $S_{M1}$ is the first extreme value between $S_1$, $S_3$, and $S_{M2}$ is the second extreme value between $S_2$, $S_4$; and setting the swerves as the substantial swerves when the edge-to-edge difference of two adjacent swerves among the swerves exceeds the predetermined noise range.

4. The method of claim 1, wherein the substantial edge-to-edge differences comprises a plurality of ascending edge-to-edge differences and a plurality of descending edge-to-edge differences.

5. The method of claim 4, wherein the acceptable range comprises an acceptable ascending range and a acceptable descending range.

6. The method of claim 5, wherein the predetermined frequency limit comprises an ascending frequency limit and a descending frequency limit, if an ascending frequent for the ascending edge-to-edge differences exceeding the acceptable ascending range is higher than the ascending frequency limit, an alert is generated automatically to indicate aberration in the apparatus, if the descending frequency for the descending edge-to-edge differences exceeding the acceptable descending range is higher than the descending frequency limit, an alert is generated automatically to indicate aberration in the apparatus.

* * * * *